Figure 3:
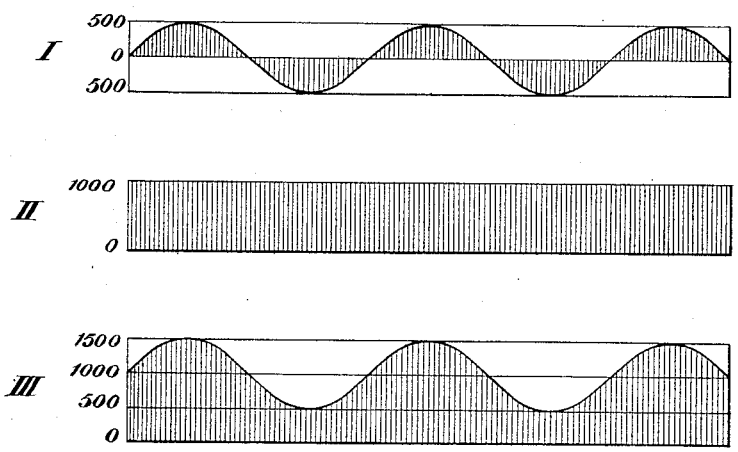

(No Model.) 2 Sheets—Sheet 1.
DE WITT B. BRACE.
SYSTEM OF ELECTRICAL DISTRIBUTION.
No. 484,549. Patented Oct. 18, 1892.
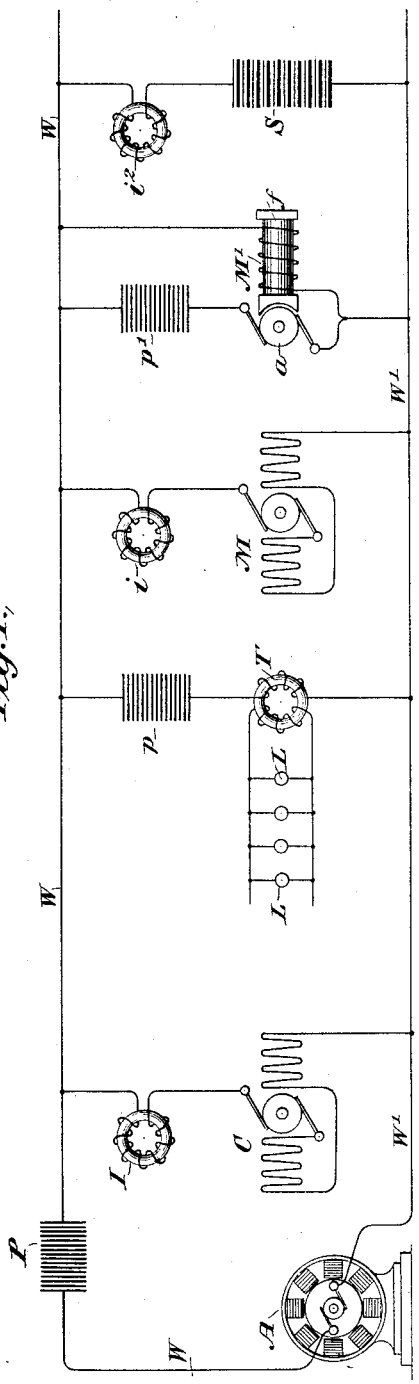
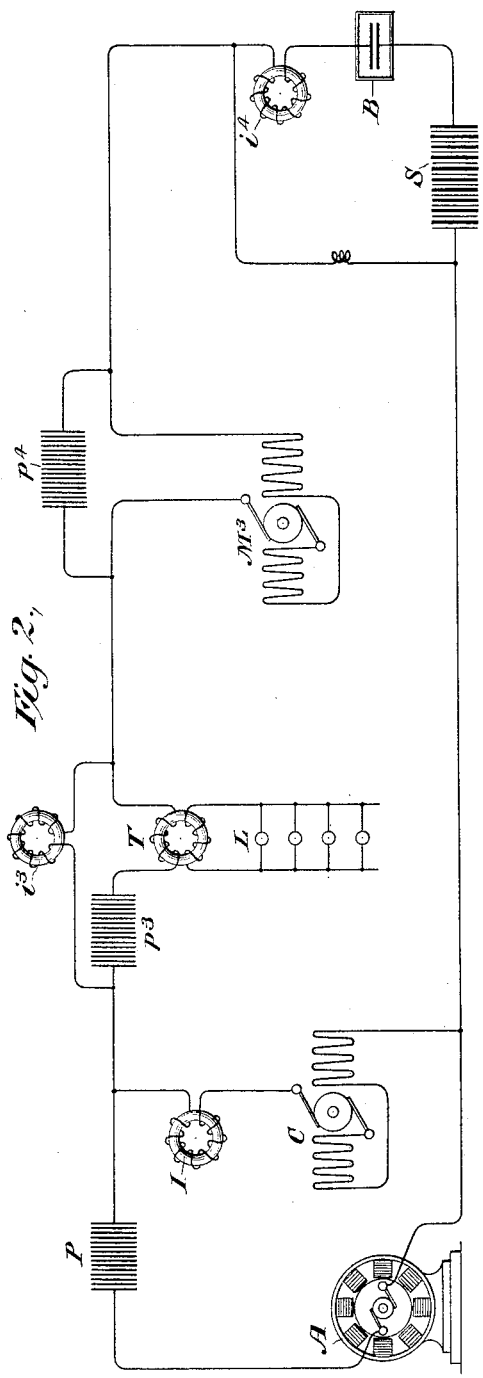
Witnesses
C. E. Ashley
H. W. Lloyd
Inventor
De Witt B. Brace
By his Attorneys
Pope & Rogers (No Model.) 2 Sheets—Sheet 2.

DE WITT B. BRACE.
SYSTEM OF ELECTRICAL DISTRIBUTION.

No. 484,549. Patented Oct. 18, 1892.

Witnesses
C. E. Ashley
I. W. Lloyd.

Inventor
De Witt B. Brace
By his Attorneys
Pope & Rogers

UNITED STATES PATENT OFFICE.

DE WITT B. BRACE, OF LINCOLN, NEBRASKA.

SYSTEM OF ELECTRICAL DISTRIBUTION.

SPECIFICATION forming part of Letters Patent No. 484,549, dated October 18, 1892.

Application filed September 16, 1891. Serial No. 405,857. (No model.)

*To all whom it may concern:*

Be it known that I, DE WITT B. BRACE, a citizen of the United States, residing at Lincoln, in the county of Lancaster and State of Nebraska, have invented certain new and useful Improvements in Systems and Apparatus for Electrical Distribution, of which the following is a specification.

The systems of electrical distribution heretofore in general use may be divided, broadly, into two classes, the respective characteristics of which depend upon the character of the electric current employed. In one of these, usually known as the "continuous-current" system, an uninterrupted current approximately uniform in potential and volume is made to traverse the circuit, while in the other, which is known as a "periodic" or "rhythmical" current system, both the potential and volume of current are subject to a rapidly and uniformly recurring periodic variation. It has hitherto been usual to distribute these two classes of electric currents by means of distinct and independent circuits and apparatus.

My invention comprises a method of operation and an organization of apparatus by which both classes of currents may be simultaneously transmitted and delivered through one and the same circuit in such manner that by appropriate translating devices each current may be independently utilized at pleasure without interfering with the other.

The accompanying drawings represent a theoretical diagram of a system of electrical distribution embodying my invention and suitable apparatus by means of which my improved method may be carried into effect.

Figure 1 is a diagrammatical representation of an organization of circuits and apparatus for carrying out my invention. Fig. 2 is a modification of the same; and Fig. 3 is a representation in diagram of the characteristics of the electric currents flowing in the conductors in different parts of the system.

Referring to Fig. 1, A represents a generator of periodic currents, preferably of the type known as "alternating." C is another generator of any suitable continuous direct-current type. These two generators are coupled in separate parallel branches to a pair of feeders, mains, or distributing-conductors W W', which extend parallel with each other, or nearly so, to the locality at which the electric energy is to be delivered. At such point or points of delivery translating devices of different well-known kinds adapted to be actuated by either continuous or periodic currents are connected between the main conductors W W', and in the present instance in parallel with each other. For example, I have shown in the drawings an inductional transformer T, of a well-known type, having its primary included in a cross branch between the mains W W', while its secondary feeds a group of incandescent lamps L L. I have also shown a continuous-current electric motor M of a well-known type, a second motor M' of a somewhat different construction, having its field $f$ and armature $a$ in parallel or shunt to each other, (the armature being designed to be actuated by periodic currents,) and a storage-battery or accumulator S.

In the branch or cross circuit which includes the periodic generator A, I place in addition thereto some suitable instrumentality which offers to a continuous direct current a counter electro-motive force approximating in value the impressed electro-motive force due to the action of the direct-current generator C. For example, a liquid-condenser composed of carbon plates having an electrolyte interposed between them (sometimes termed a "polarization-battery") may be employed, which electrolyte while in the act of polarizing opposes a counter electro-motive force to the polarizing-current. A similar device $p$ is placed in the branch with the transformer T, and still another one $p'$ in the armature branch of the shunt-motor M'. These several devices, although strongly opposing the passage through them of continuous direct currents, being, as it were, highly opaque to such currents, nevertheless offer but little resistance to the passage of periodic currents, more especially when alternating in character. In the remaining cross branches I place devices of a different character—such, for example, as an annular electro-magnet having a high coefficient of self-induction, (sometimes termed a "choking-coil,") which while highly opaque to the passage of an alternating or periodic current offers no material resistance to the passage of a continuous direct current. I have shown such devices at I, $i$, and $i^2$. The field-magnet $f$ of the motor M' also, by virtue of its inherent capacity for self-induction, performs a similar function.

A modified organization of my apparatus, which is more convenient for use under some circumstances, is shown in Fig. 2. In carrying out this plan the various translating devices may be introduced in series in the main circuit, or, more properly, in a series of short branches successively diverging from and returning again to the main circuit. The translating devices shown are a transformer T, a motor $M^3$, a storage-battery or accumulator S, and an electrolytic bath B, the first of which requires a periodic and the other three a continuous current. The polarizer $p^3$ permits the periodic current to pass to the transformer T, while the inductor $i^3$ opposes its passage through the alternative branch. In the case of the motor $M^3$ the self-induction of the field-magnet is usually sufficient to force the alternating current to pass through the other branch containing the polarizer $p^4$. In like manner the inductor $i^4$ keeps the alternating current out of the branch containing the accumulator S and bath B.

In both organizations, Figs. 1 and 2, the principle of operation is identical—viz., to divide the main circuit into two branches at each translating device, one of which is opaque to periodic and the other to continuous currents.

With the apparatus arranged in the manner hereinbefore described, and as shown in Figs. 1 and 2, it will be understood that when both generators A and C are in operation at the same time the periodic generator A will send out a current having an electro-motive force of, say, five hundred volts, of the character conventionally represented by the curve in Fig. 3 at I, while the continuous direct generator C will send a current of corresponding electro-motive force, represented in like manner in Fig. 3 at II. These two currents will be superposed in the mains W W', giving rise to an electrical condition therein which is represented in Fig. 3 at III. Each of the several translating devices referred to will receive its appropriate current, the continuous current being shut out of the alternating translating devices by the polarizing batteries or other equivalent devices P, $p$, $p'$, &c., while, on the other hand, the alternating-current is shut out of the direct-current translating devices by the inductive or other equivalent devices I, $i$, and $i'$, &c.

I claim as my invention—

1. In a system of electrical distribution, the hereinbefore-described method of simultaneously transmitting periodic and continuous currents, which consists in generating periodic currents in one branch and continuous currents in another branch of a given circuit and in causing the same to be superposed in the undivided portion of said circuit by rendering the first branch opaque to continuous and the second branch opaque to periodic currents, substantially as and for the purpose set forth.

2. In a system of electrical distribution, the combination, with a single pair of main conductors, of a generator of periodic currents and translating devices actuated by such currents included in separate parallel branches between said main conductors, an electrolytic condenser offering a higher resistance to continuous than to periodic currents included in each of said branches, a generator of continuous currents and a translating device actuated by such currents, each included in a separate parallel branch between the same main conductors, and an inductor included in each of said branches, which offers a higher resistance to periodic than to continuous currents, substantially as and for the purpose set forth.

In testimony whereof I have hereunto subscribed my name this 4th day of September, A. D. 1891.

DE WITT B. BRACE.

Witnesses:
FRED G. WOODIN,
EDWARD J. WARD.